(12) United States Patent
Steinbrueck

(10) Patent No.: US 10,336,552 B1
(45) Date of Patent: Jul. 2, 2019

(54) PROXIMITY DETECTOR

(71) Applicant: BECS Technology, Inc., St. Louis, MO (US)

(72) Inventor: Todd Steinbrueck, St. Louis, MO (US)

(73) Assignee: BECS TECHNOLOGY, INC., St. Louis, MO (US)

( * ) Notice: Subject to any disclaimer, the term of this patent is extended or adjusted under 35 U.S.C. 154(b) by 0 days.

(21) Appl. No.: 15/476,586

(22) Filed: Mar. 31, 2017

(51) Int. Cl.
  *G01F 23/292* (2006.01)
  *B65G 43/08* (2006.01)
  *B65G 65/46* (2006.01)
  *A01K 5/02* (2006.01)
  *A01K 39/012* (2006.01)

(52) U.S. Cl.
  CPC ............ *B65G 43/08* (2013.01); *A01K 5/02* (2013.01); *A01K 5/0258* (2013.01); *A01K 39/012* (2013.01); *B65G 65/46* (2013.01); *G01F 23/2921* (2013.01); *G01F 23/2924* (2013.01)

(58) Field of Classification Search
  CPC ................. A01K 5/0258; G01F 23/2921
  See application file for complete search history.

(56) References Cited

U.S. PATENT DOCUMENTS

| | | | | |
|---|---|---|---|---|
| 9,408,369 | B2* | 8/2016 | Dubinsky | ............... A01K 5/02 |
| 2010/0200089 | A1* | 8/2010 | Fleshner | ............. A01K 5/0258 137/551 |
| 2012/0104032 | A1* | 5/2012 | Bahn | ........................ B65B 1/12 222/1 |
| 2013/0036976 | A1* | 2/2013 | Pickens | ............. A01K 39/0125 119/51.01 |
| 2017/0142930 | A1* | 5/2017 | Huang | ................ A01K 5/0216 |
| 2018/0044113 | A1* | 2/2018 | Westover | ............ B65G 11/166 |

* cited by examiner

*Primary Examiner* — Thomas Randazzo
(74) *Attorney, Agent, or Firm* — Bryan Cave Leighton Paisner LLP

(57) ABSTRACT

A proximity detector includes a sensor providing a proximity reading. The proximity detector is capable of comparing the reading to a rising threshold level and a falling threshold level, wherein the falling threshold level is less than the rising threshold level. The proximity detector continuously stores a minimum reading value for the proximity reading. The proximity detector will report the presence of granular material only if the proximity reading remains less than the falling threshold level and within an epsilon value of the minimum reading value for a predetermined period of time.

10 Claims, 6 Drawing Sheets

PROXIMITY DETECTOR

FIELD OF THE INVENTION

This invention relates generally to methods and systems for detecting the presence of materials near a sensor and, more particularly, to improvements in the techniques for processing signals received by proximity detectors capable of sensing the presence of granular materials.

BACKGROUND OF THE INVENTION

Proximity detectors may be used to detect the presence or level of granular materials. In general, these proximity detectors must be, and remain, properly calibrated. There are a number of issues in the field that can make the calibration of a proximity detector problematic.

Proximity detectors come in a number of forms, e.g., optical, capacitive, etc. Each of these sensing mechanisms has its advantages and disadvantages. For example, capacitive sensors can be impacted by various environmental factors, such as humidity, which can alter the baseline capacitance reading in the absence of material in the proximity of the detector. As a second example, the strength of the signal from an optical sensor can be impacted by the color of the granular material. Light colored material (white/yellow) will allow more reflected light through while dark colored material (brown) gives a greater signal contrast between presence and absence of material. As a third example, various component pieces of the sensor (or associated electronics) can drift over time (e.g., diminished light output from an optical light source or diminished sensitivity for an optical detector). Thus, there is a need for a system implementing techniques to mitigate these issues.

SUMMARY OF THE INVENTION

According to one aspect of the present invention, a distribution system includes a conveyor having a proximal end and a distal end with a bin storing granular material positioned near the proximal end of the conveyor so that it may distribute the material to the conveyor. A plurality of feeders are distributed along and beneath the conveyor to receive the granular material from the conveyor through a plurality of delivery tubes. A proximity detector is located operationally adjacent to the delivery tube at the distal end of the conveyor. The proximity detector may take many forms, such an optical sensor providing a light intensity reading. The proximity detector is capable of comparing the light intensity reading to a rising threshold level and a falling threshold level, wherein the falling threshold level is less than the rising threshold level. The proximity detector continuously stores a minimum reading value for the light intensity reading. The proximity detector will report the presence of granular material in the delivery tube only if the light intensity reading remains less than the falling threshold level and within an epsilon value of the minimum reading value for a predetermined period of time.

In another embodiment, the proximity detector continuously stores a maximum reading value for the light intensity reading. In the situation where the proximity detector is reporting material present and the light intensity reading rises above the rising threshold level and remains above the rising threshold level and within the epsilon value of the maximum reading value for a predetermined period of time, the proximity detector will report no material present.

The algorithms described herein will be resilient to threshold placement and capable of recalibration by exploiting the varying nature of the signal during the transition region.

BRIEF DESCRIPTION OF THE FIGURES

These and other features, aspects and advantages of the invention will become more fully apparent from the following detailed description, appended claims, and accompanying drawings, wherein the drawings illustrate features in accordance with an exemplary embodiment of the present invention, and wherein:

DETAILED DESCRIPTION OF THE INVENTION

Figure 1:
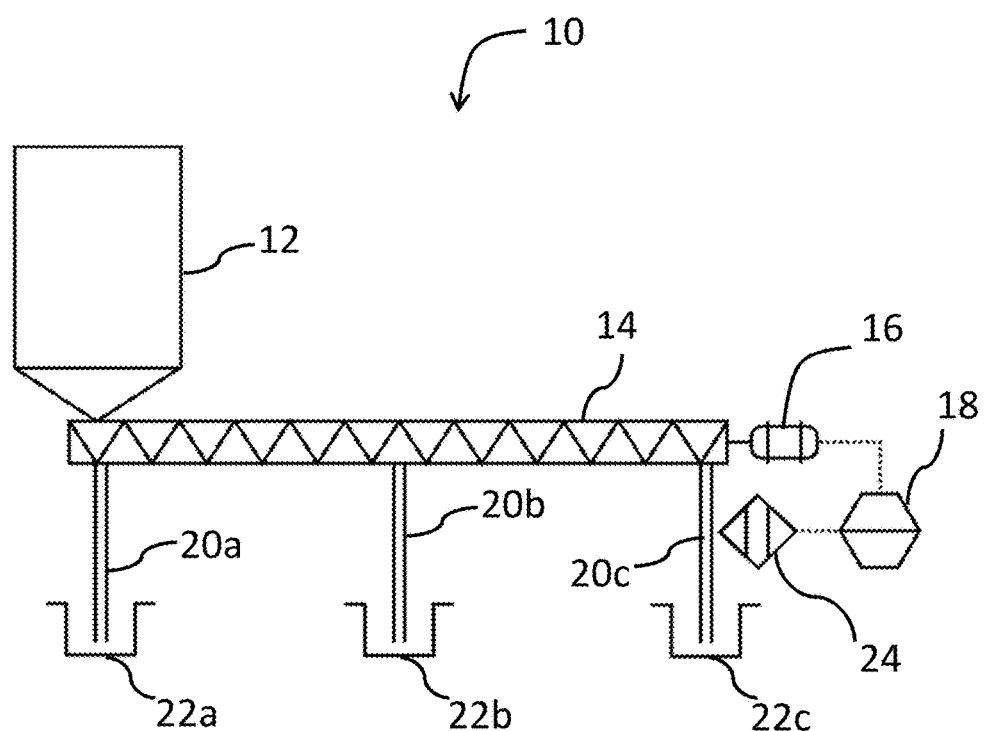
FIG. 1 is a block diagram illustrating the principal components of an embodiment of a granular material distribution system.

Various embodiments may be described in connection with a feed distribution system, although the systems and methods described herein may be used with other forms of systems tracking the movement or collection of granular material. Referring to FIG. 1, the feed distribution system 10 includes a feed bin 12 housing animal feed (or any form of granular material) for dispersion to a screw-based conveyor 14 (e.g., an auger) for delivery to a set of feeders 22 distributed along the conveyor 14. As feed is moved from the bin 12 to the feeders 22, the left-most feeder 22a fills first, followed by feeder 22b, and then the feeder 22c at the distal end of the conveyor. Of course, the system 10 may include any reasonable number of feeders. The feeders 22 may receive the granular feed from the conveyor 14 thru delivery tubes 20. A proximity detector 24 may be located operationally adjacent to the delivery tube 22c connected to the final feeder 22c. When the proximity detector 24 senses feed in the delivery tube 22c, thus signaling that all feeders 22 are full, it commands to conveyor motor 16 to stop via microprocessor 18. Preferably, the proximity detector 24 includes one or more optical sensors, each providing a light intensity reading. Other forms of proximity detectors are also within the scope, including those using capacitive sensors.

Figure 2:
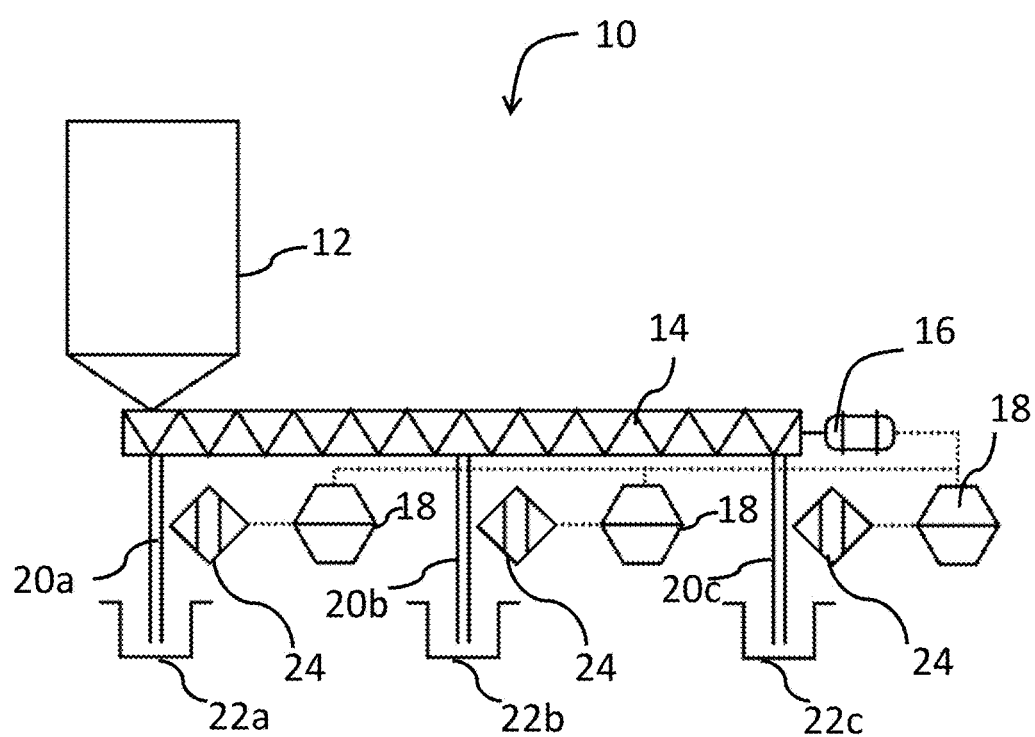
FIG. 2 is a block diagram illustrating the principal components of an another embodiment of a granular material distribution system.

Another system 10 is illustrated in FIG. 2, in which each delivery tube 20a, 20b, and 20c, leading to the feeders 22a, 22b, and 22c, is instrumented with a proximity detector 24 coupled to the motor 16 through microprocessors 18. Only when all of the proximity detectors 24 are indicating the presence of feed is the motor 16 driving the conveyor 14 turned off.

Figure 3:
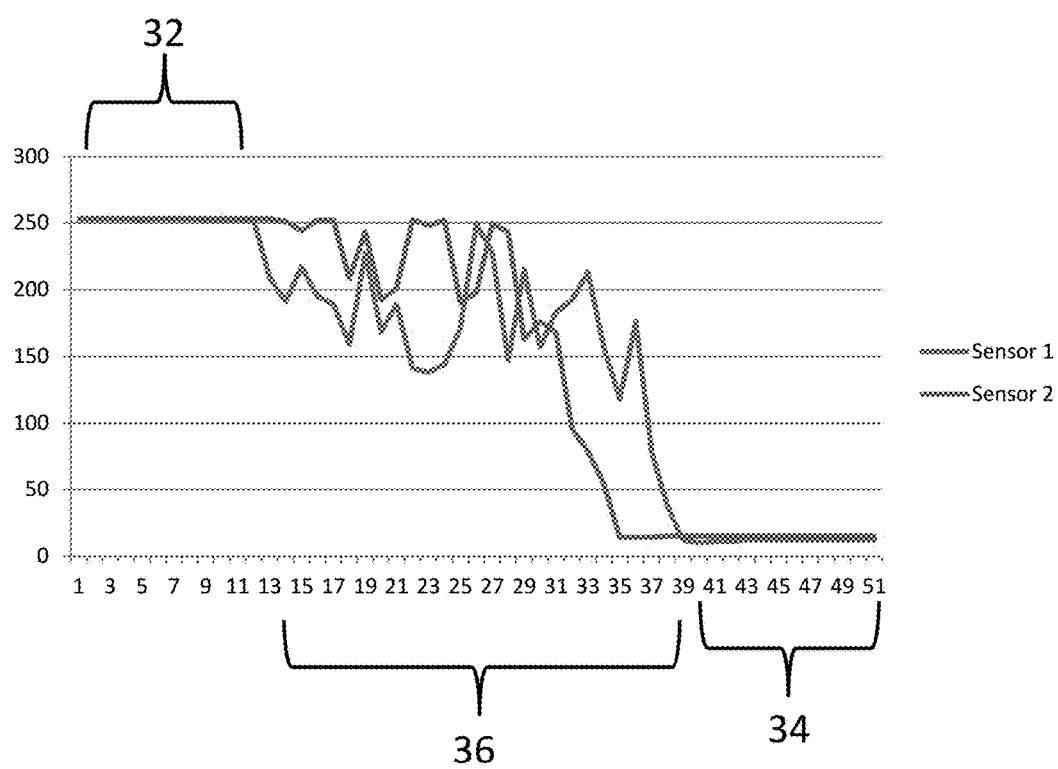
FIG. 3 is a representation of signal traces from two optical sensors.

FIG. 3 illustrates a pair of raw sensor readings from an optical proximity detector, such as one that may be used with the configurations depicted in FIGS. 1 and 2. In this embodiment, the proximity detector 24 has two light sources and two photodetectors, and is capable of sensing transmitted light intensity across two paths crossing the delivery tube 20. Without feed, at the beginning of the trace, the signal is high on both sensors, indicating no feed is present. As feed is delivered and is falling through the delivery tube 20, the transmitted light varies over a period of time. Once the feed fills the delivery tube, the signal level stabilizes at a low level.

As depicted in FIG. 3, between the initial no feed condition 32 and the final feed present condition 34, there is a varying signal region 36 during which the signal may be highly varying. The existence of this varying signal region 36 may be exploited to improve the operation of the proximity detection function.

Conventional proximity detectors establish a threshold signal level, and when the raw sensor reading passes this threshold, the sensor indicates "feed present." However, in connection with FIG. 3, if a threshold of 150 were used with the raw signals, sensor 2 would operate properly. However, sensor 1 would indicate "feed (or material) present" at time 22, return to "no feed" at time 25, again briefly indicate "feed present" at time 28, and toggle between "no feed" and "feed present" some more before finally stabilizing at "feed present" at time 37. Although one may simply lower the detection threshold to 100, feed having a different color may exhibit the same behavior at this new threshold. The algorithms described herein will be resilient to threshold placement by exploiting the varying nature of the signal during the transition region.

In one embodiment, an algorithm for processing the signals from the proximity detector 24 for reporting the presence of feed in the delivery tube 20 includes three states: (i) no feed; (ii) transition; and (iii) feed present. The result or output of the algorithm will be positive (i.e., feed present) only for the final feed present state, while it will be negative (i.e., no feed) for both the no feed and transition states. Thus, the algorithm does not permit the output of the proximity detector to show feed present while the signal is toggling during the varying signal region.

The proximity detector 24 receives a current light intensity reading from the photodetector and repetitively compares the current light intensity reading to a preset rising threshold level and a preset falling threshold level. In certain embodiments, the detector also tracks the minimum and/or the maximum values of the light intensity reading, i.e., the value of the light intensity reading at its lowest and highest value.

In this embodiment, the proximity detector 24 continuously stores a minimum reading value for the light intensity reading. The proximity detector 24 preferably reports the presence of feed (or any other form of granular material) in the delivery tube only if the light intensity reading remains less than the falling threshold level and within a small epsilon value of the minimum reading value for a predetermined period of time. For example, in connection with grain, the small epsilon value may be approximately 1-2% of the total range for the intensity signal and the predetermined period of time may be about one-half to two seconds.

Figure 4:
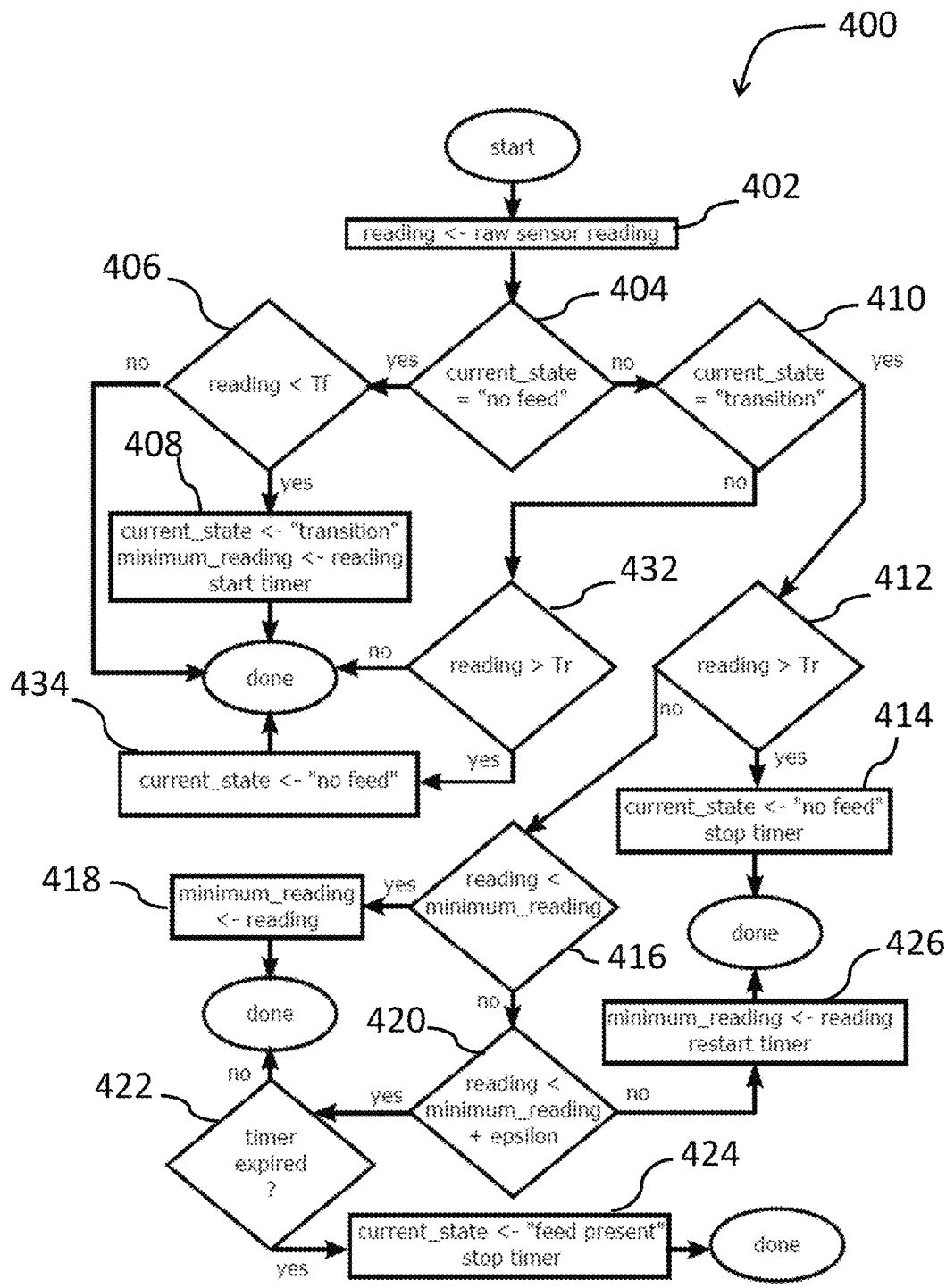
FIG. 4 is a flow chart describing an algorithm used to process signals from a proximity detector used with a granular material distribution system.

FIG. 4 illustrates a method 400 for determining the presence of feed in the delivery tube 20 in greater detail. The algorithm provides two thresholds: a falling threshold (Tf) and a rising threshold (Tr). Upon startup, the initial state is set to "no feed." The method 400 takes different control paths based on whether the current state is no feed, transition, or feed present.

At step 402, the variable current reading is set based on the light intensity from the raw sensor reading. At step 404, if the current state is no feed, and if, at step 406, the reading is less than the falling threshold (Tf), then: (i) the current state is set to transition; (ii) the variable minimum reading is set to the current reading; and (iii) a timer is initialized to, for example, about 500 to 2,000 msec (step 408). This timer counts down with each successive reading of the light intensity and, thus, each pass through the algorithm depicted in FIG. 4. For example, referring to FIG. 3, if the falling threshold is set to 150, the transition state would start at time 22 for sensor 1.

If, however, the current state is "transition" (step 410), and if the current reading is greater than the rising threshold (Tr) (step 412), then, at step 414, the current state is set back to "no feed" and the timer is stopped. This situation would occur when the signal fell below the falling threshold level, but then quickly rose back above the rising threshold level before the timer expired. Continuing the example from the previous paragraph with respect to FIG. 3, if the rising threshold is set to 200, at time 26 the algorithm would return to the "no feed" state. It will return to the transition state at time 35, and after time 40, whenever the timer expires, the algorithm will go to the "feed present" state. Otherwise, if the current reading is less than the minimum reading (step 416), then at step 418, the variable minimum reading is set to the current reading in order to track the minimum intensity reading. While still in the transition stage, at step 420, if the current reading is less than the minimum reading plus a small epsilon value, and if the timer has expired (step 422), then, at step 424, the current state is set to "feed present" and the timer is stopped. Otherwise, where the current reading is greater than or equal to the minimum reading plus a small epsilon amount, indicating that the signal remains highly variable and does not appear to be stabilizing at a low point, then at step 426, the minimum reading is set to the current reading and the timer re-started.

If the current state is feed present, and if the current reading is greater than the rising threshold (Tr) (step 432), the current state is set to "no feed" at step 434.

Figure 5:
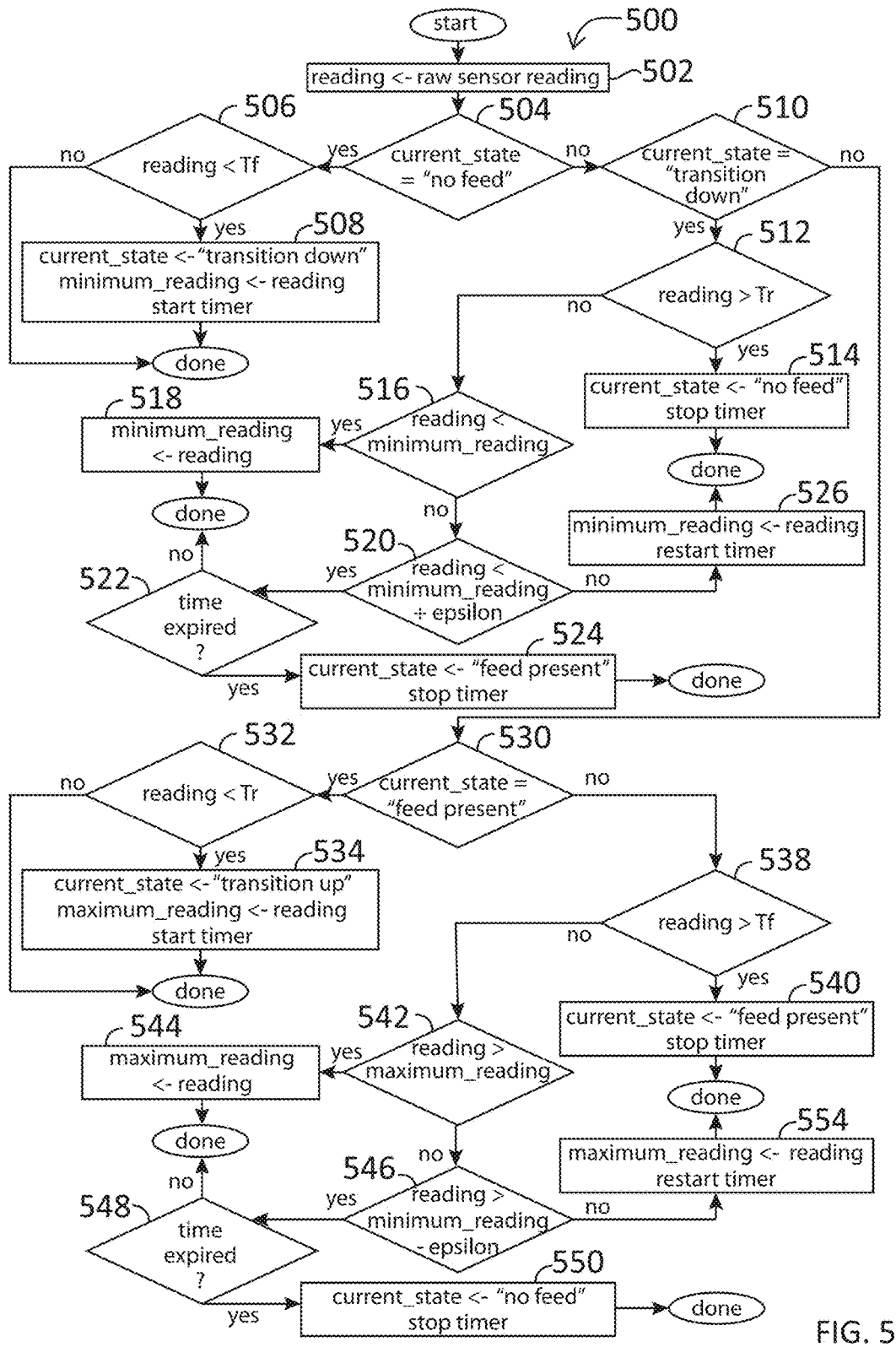
FIG. 5 is a flow chart describing an alternative algorithm used to process signals from a proximity detector used with a granular material distribution system.

As illustrated in FIG. 5, the above algorithm can be expanded to 4 states: "no feed", "transition down", "transition up", and "feed present" if the desire is to maintain the previous output during the transitions. In this case, the output would signal proximity detected for the "feed present" and "transition up" states and no proximity detected for the "no feed" and "transition down" states.

In this embodiment, the proximity detector 24 continuously stores a maximum reading value for the light intensity reading in addition to the minimum reading value. Here, when the proximity detector 24 is reporting material present and the light intensity reading rises above the rising threshold level and remains above the rising threshold level and within a small epsilon value of the maximum reading value for a predetermined period of time, the proximity detector will report no material present.

In this embodiment, the method takes different control paths based on the current state: no feed, transition up, feed present, and transition down. Again, the initial state is "no feed." The method 500 begins at step 502 in which the current reading is set based on the light intensity from the raw sensor reading. At step 504, if the current state is no feed and if the current reading is less than the falling threshold (Tf) (step 506), the control passes to step 508 in which the current state is set to "transition down," the variable minimum reading is set to the value of the current reading, and a timer is initiated. This timer counts down with each successive reading of the light intensity and, thus, each pass through the algorithm depicted in FIG. 5.

In step 510, if the current state is "transition down," and if the current reading is greater than the rising threshold (Tr) (step 512), then, in step 514, the current state is set to "no feed," and the timer is stopped, indicating that the intensity ready temporarily fell below the falling threshold, but quickly rose back up above the rising threshold (thus indicating the high variability of the signal). Otherwise, if the current reading is less than the minimum reading (step 516), then the variable minimum reading is set to the current reading (step 518). In step 520, if the current reading is less than the minimum reading plus a small epsilon value, and if the timer has expired (step 522), then, in step 524, the current state is set to "feed present," and the timer is stopped. Otherwise, where the current reading is greater than the minimum reading plus the small epsilon value, control passes to step 526 where the minimum reading is set to the current reading and the timer is restarted.

In step 530, if the current state is "feed present," and if the current reading is greater than the rising threshold (Tr) (step 532), the control passes to step 534 in which the current state is set to "transition up," the variable maximum reading is set to the current reading, and a timer is started.

Where the current state is "transition up," if the current reading is less than the falling threshold (Tf) (step 538), the control passes to step 540, in which the current state variable is set to "feed present," and the timer is stopped. Otherwise, in step 542, if the current reading is greater than the maximum reading, the maximum reading variable is set to the current reading in order to track the maximum intensity reading (step 544). In step 546, if the current reading is greater than the maximum reading less a small epsilon value and, in step 548, if the timer has expired, then in step 550, the current state is set to "no feed," and the timer is stopped. Otherwise, where the current reading is less than or equal to the maximum reading less a small epsilon value, then control passes to step 554 in which the variable maximum reading is set to the current reading and the timer is re-started.

Yet another embodiment is to retain a series of readings, for example, over a period of time (e.g., about 1 to 2 seconds), and operate not on just the latest of these readings, but operate on the collection of readings taken over the period. If, over the period, the variations in the readings (highest reading to lowest reading) are greater than a preset selected value, then the current state is set to transition. If, over the period, the variations in the readings are less than the preset selected value, the state is either no feed or feed present, which can be determined by comparing the latest reading to the thresholds.

When the system is not in transition (i.e., material is either present or not present), the readings over the period may be averaged to determine the "nominal" reading for the current state ("no feed" or "feed present"). Any time the reading crosses the threshold, a new threshold may be computed, for example, half-way between the "nominal" reading in the "no feed" state and the "nominal" reading in the "feed present" state.

In another embodiment, the proximity detector 24 may include two optical sensors—i.e., two pairs of light sources and photodetectors. The optical sensors may be arranged such that the light rays cross the delivery tube 20 at varying angles and or locations. The proximity detector 24 may use either of the algorithms described above in connection with FIG. 4 or 5 with certain modifications to account for the inclusion of two (or more) readings from the sensors. For example, steps 402 and 502 may be expanded to include two current reading variables—one based on the light intensity from a first raw sensor reading, and a second based on the light intensity from a second raw sensor reading. At each step where comparisons are made to the current reading, the two current readings are both compared and combined either with an AND function (i.e., the test must be true for all readings) or an OR function (i.e., the test must be true for any reading). Alternatively, the algorithms may be executed for each input reading individually and the results combined. For example, if any algorithm is in the "feed present" state, then the proximity detector will indicate feed detected.

For a system such as illustrated in FIG. 2, which uses a detector 24 at each delivery tube 20, the methods illustrated in FIG. 4 or 5 may be used with each detector 24 and the conveyor 14 shut off when any of the detectors 24 indicates feed present or, alternatively, when all of the detectors 24 indicate feed present.

An extension of the above approaches illustrated in FIGS. 4 and 5 uses the minimum reading detected during the "feed present" state and the maximum reading detected during the "no feed" state to automatically adjust the two threshold values. This embodiment enables the proximity detector 24 to compensate for varying conditions that might impact the raw values (e.g., humidity for a capacitive sensor, feed color for an optical sensor).

For example, the minimum and maximum readings may be maintained while in the "feed present" and "no feed" states, and then reset when exiting the respective "feed present" or "no feed" state, so that a new minimum and maximum is maintained each time the system enters the state. Using this approach, the thresholds can be maintained at a fixed ratio of the full scale swing experienced by the raw readings. For example, the rising threshold may be set to Tr=minimum+0.75*(maximum−minimum) and the falling threshold may be set to Tf=minimum+0.25*(maximum−minimum). In this way, the proximity detector 24 will adapt to changing conditions on each transition to/from feed being present.

Figure 6:
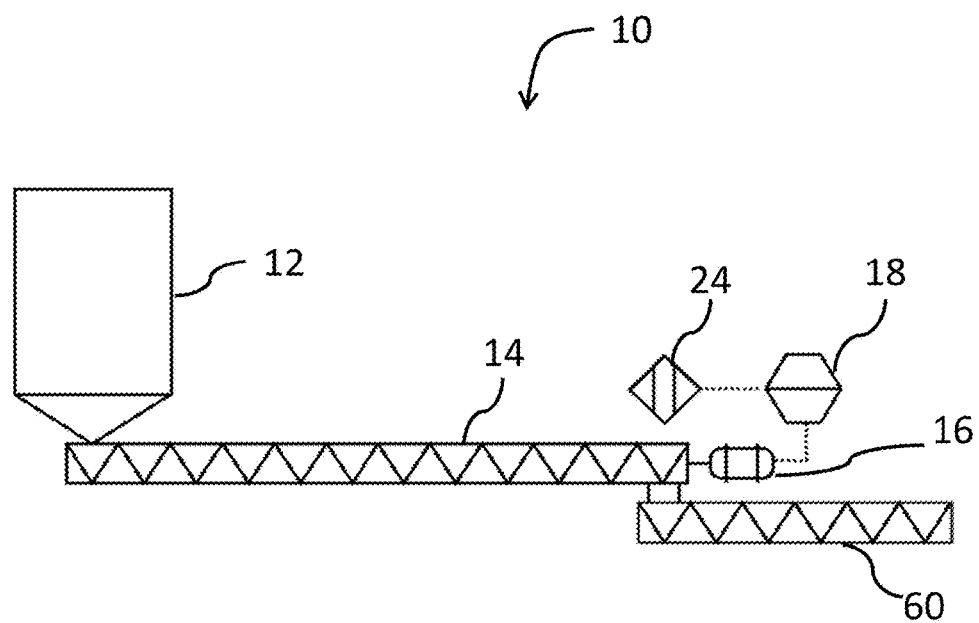
FIG. 6 is a block diagram illustrating the principal components of another embodiment of a granular material distribution system.

FIG. 6 illustrates an alternative system that includes two conveyors. The first conveyor 14 feeds a second conveyor 60 (which might not support the same feed movement rate as conveyor 14). In this embodiment, the proximity detector 24 is positioned above or adjacent the distal end of the first conveyor 14. In the event the second conveyor 60 is either stopped or running slower than the first conveyor, feed will quickly build up at the end of the first conveyor 14. The proximity detector 24 preferably detects this buildup of feed.

If, in this configuration, the system does not see regular transitions between feed present and feed not present, the method described above whereby the thresholds are automatically adjusted may not adjust properly. An alternative embodiment, which is aimed at addressing slowly changing environmental conditions (such as humidity) or slowly changing circuit parameters (such as light source intensity), relies on observing raw signal changes at two different time scales, the long time scale associated with environmental conditions changing and the short time scale associated with feed backing up at the end of the first conveyor.

Using any of the algorithms described above, the rising and falling thresholds may be set relative to a baseline value. For example, the current intensity reading may be compared to the falling threshold plus a baseline value, where the baseline value is initialized to zero. Similarly, all reading comparisons to the rising or falling thresholds are equivalently transformed.

While in the "feed present" state, the baseline is continually updated with a low-pass filtering average computation, such as (baseline=←α*current reading+(1-a)*baseline), where a is chosen to reflect the long time scales associated with environmental change.

While in the "no feed" state, we must compensate for the fact that the baseline value is at the other end of the range of raw sensor readings. To accomplish this, we maintain an average reading in the "no feed" state that is similar in style to the baseline value, such as no_feed_avg=α*current reading+(1−α)*no_feed_avg. The baseline may then be adjusted by exploiting the most recently measured span, which is span=maximum intensity reading less the minimum intensity reading. The expression for baseline is therefore baseline=no_feed_avg−span. This enables the effective thresholds (actual values to which raw readings are compared) to adjust over time, even without a state transition.

Although certain illustrative embodiments and methods have been disclosed herein, it will be apparent from the foregoing disclosure to those skilled in the art that variations and modifications of such embodiments and methods may be made without departing from the spirit and scope of the invention. For example, although many of the embodiments described herein have been described using a proximity detector incorporating optical sensors, it will be understood that the embodiments are equally effective using other forms of sensors such as capacitive sensors. In addition, although many of the embodiments illustrated herein are feed distribution systems, the systems and methods described herein may be used in connection with proximity detectors used to sense any granular material. Accordingly, it is intended that the invention should be limited only to extent required by the appended claims and the rules and principals of applicable law.

The invention claimed is:

1. A proximity detector comprising a sensor providing a proximity reading, the proximity detector having a rising threshold level and a falling threshold level, wherein the falling threshold level is less than the rising threshold level, wherein the proximity detector continuously stores a minimum reading value for the proximity reading, and wherein the proximity detector will report the presence of granular material only if the proximity reading remains less than the falling threshold level and within an epsilon value of the minimum reading value for a predetermined period of time.

2. The proximity detector of claim 1 wherein the proximity detector comprises a state selected from the group of no material present, transition, and material present and wherein the proximity detector:
    enters the transition state when the proximity reading is less than the falling threshold;
    enters the material present state when the proximity reading remains less than the falling threshold level and within the epsilon value of the minimum reading value for the predetermined period of time; and
    enters the no material present state when the proximity reading is greater than the rising threshold level.

3. The proximity detector of claim 1 wherein the proximity detector comprises an optical sensor providing a light intensity reading.

4. The proximity detector of claim 1 wherein the proximity detector continuously stores a maximum reading value for the proximity reading, and wherein, when the proximity detector is reporting material present and the proximity reading rises above the rising threshold level and remains above the rising threshold level and within the epsilon value of the maximum reading value for a predetermined period of time, the proximity detector will report no material present.

5. The proximity detector of claim 4 wherein the proximity detector comprises a state selected from the group of no material present, transition down, transition up, and material present and wherein the proximity detector:
    enters the transition down state when the proximity reading is less than the falling threshold;
    enters the material present state when the proximity reading remains less than the falling threshold level and within the epsilon value of the minimum reading value for the predetermined period of time;
    enters the transition up state when state is feed present and the proximity reading is greater than the rising threshold; and
    enters the no material present state when the state is transition down and the proximity reading is greater than the rising threshold level.

6. The proximity detector of claim 5 wherein the rising threshold level and falling threshold level are adjusted as ratios of the maximum reading value and the minimum reading value when the proximity detector exits the material present and no material present states.

7. The proximity detector of claim 5 wherein the proximity detector further comprises a baseline value and wherein the rising and falling threshold values are adjusted based on the baseline value and, when the proximity detector is in the material present state, the baseline is continually updated using a low-pass filtering average.

8. The proximity detector of claim 7 wherein when the proximity detector is in the no material state, the baseline value is updated based on an average of the proximity reading while in the no material state and the difference between the maximum and minimum reading values.

9. A proximity detector comprising a sensor providing a proximity reading, the proximity detector reporting the presence of granular material near the detector, including a state selected from the group of no material present, transition, and material present,
    the proximity detector having a rising threshold level and a falling threshold level, wherein the falling threshold level is less than the rising threshold level,
    wherein the proximity detector records a series of proximity readings over a period of time,
    wherein the proximity detector enters the transition state if the variation in the readings is greater that a preselected transition value,
    wherein the proximity detector enters the material present state if the final proximity reading during the period of time is below the falling threshold level, and
    wherein the proximity detector enters the no material present state if the final proximity reading during the period of time is above the rising threshold level.

10. The proximity detector of claim 9 wherein the proximity detector computes an average of the proximity readings when the proximity detector is in the material present state and an average of the proximity readings when the proximity detector is in the no material present state,
    wherein the falling threshold is updated based on the average of the proximity readings for the material present state when the proximity detector changes from the material present state to the transition state, and
    wherein the falling threshold is updated based on the average of the proximity readings for the no material present state when the proximity detector changes from the no material present state to the transition state.

* * * * *